United States Patent
Kwok et al.

[11] Patent Number: 5,811,673
[45] Date of Patent: Sep. 22, 1998

[54] WIND DIRECTION INDICATOR

[75] Inventors: Wai Chiau Kwok; Lok Suen Kwan, both of Singapore, Singapore

[73] Assignee: McBell Pte, Ltd., Singapore

[21] Appl. No.: 735,096

[22] Filed: Oct. 22, 1996

[30] Foreign Application Priority Data

Feb. 16, 1996 [SG] Singapore ........................... 9601905-4

[51] Int. Cl.⁶ .............................. G01W 1/00; G01P 5/00
[52] U.S. Cl. ....................................... 73/170.05; 116/265
[58] Field of Search ........................... 73/170.01, 170.02, 73/170.03, 170.05; 116/264, 265, 271, 273, 274

[56] References Cited

U.S. PATENT DOCUMENTS

| | | | |
|---|---|---|---|
| 3,641,815 | 2/1972 | Fassett, II | 73/170.09 X |
| 3,815,413 | 6/1974 | Marshall, III et al. | 73/170.07 X |
| 4,024,833 | 5/1977 | Pook et al. | |
| 4,052,957 | 10/1977 | Lee | |
| 4,080,826 | 3/1978 | Perretta | 73/170.03 X |
| 4,215,433 | 8/1980 | Pfohl | |
| 4,389,887 | 6/1983 | Howlett | 73/170.03 |
| 4,454,757 | 6/1984 | Weinstein et al. | 73/430 X |
| 4,597,287 | 7/1986 | Thomas | 73/170.03 |
| 4,646,567 | 3/1987 | Ahmer | 73/170.03 |
| 4,886,007 | 12/1989 | Wheeler | 73/170.03 X |

FOREIGN PATENT DOCUMENTS

| | | |
|---|---|---|
| 0032573 | 7/1981 | European Pat. Off. . |
| 1557129 | 12/1967 | France . |
| 3017060 | 1/1982 | Germany . |

OTHER PUBLICATIONS

*The Practical Sailor*, vol. 8, No. 3, Feb. 1, 1982, pp. 1 and 3–5.

Primary Examiner—William L. Oen
Attorney, Agent, or Firm—Wallenstein & Wagner, Ltd.

[57] ABSTRACT

A wind direction indicator is disclosed having a rotatable wind vane 1 and a support 10 for connection to the mast of a yacht. The vane 1 is connected to the support 10 by means of a gimbal mechanism 6–9 and a stabilizing weight 4 is connected to the gimbal mechanism diametrically opposite the vane 1.

16 Claims, 5 Drawing Sheets

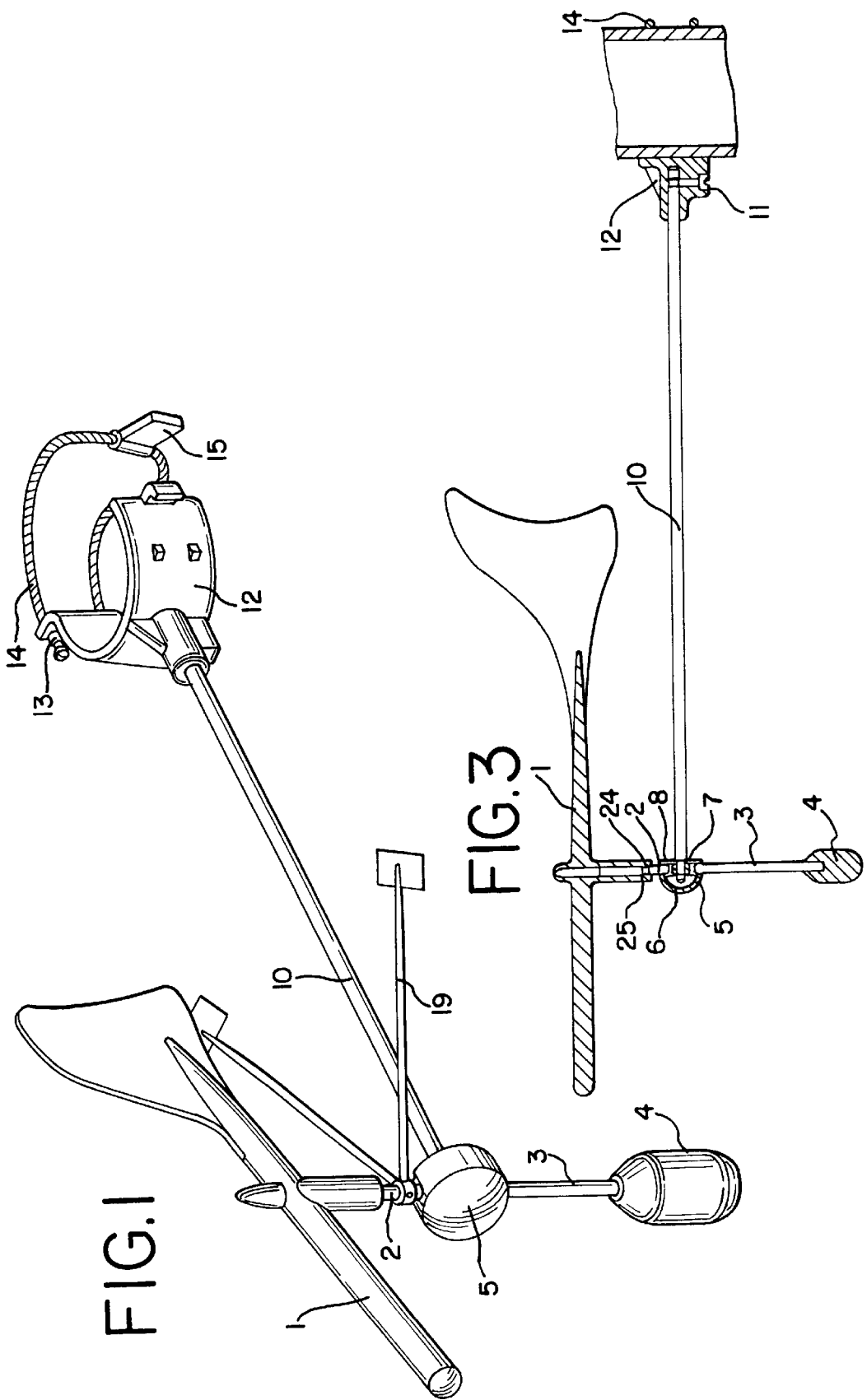

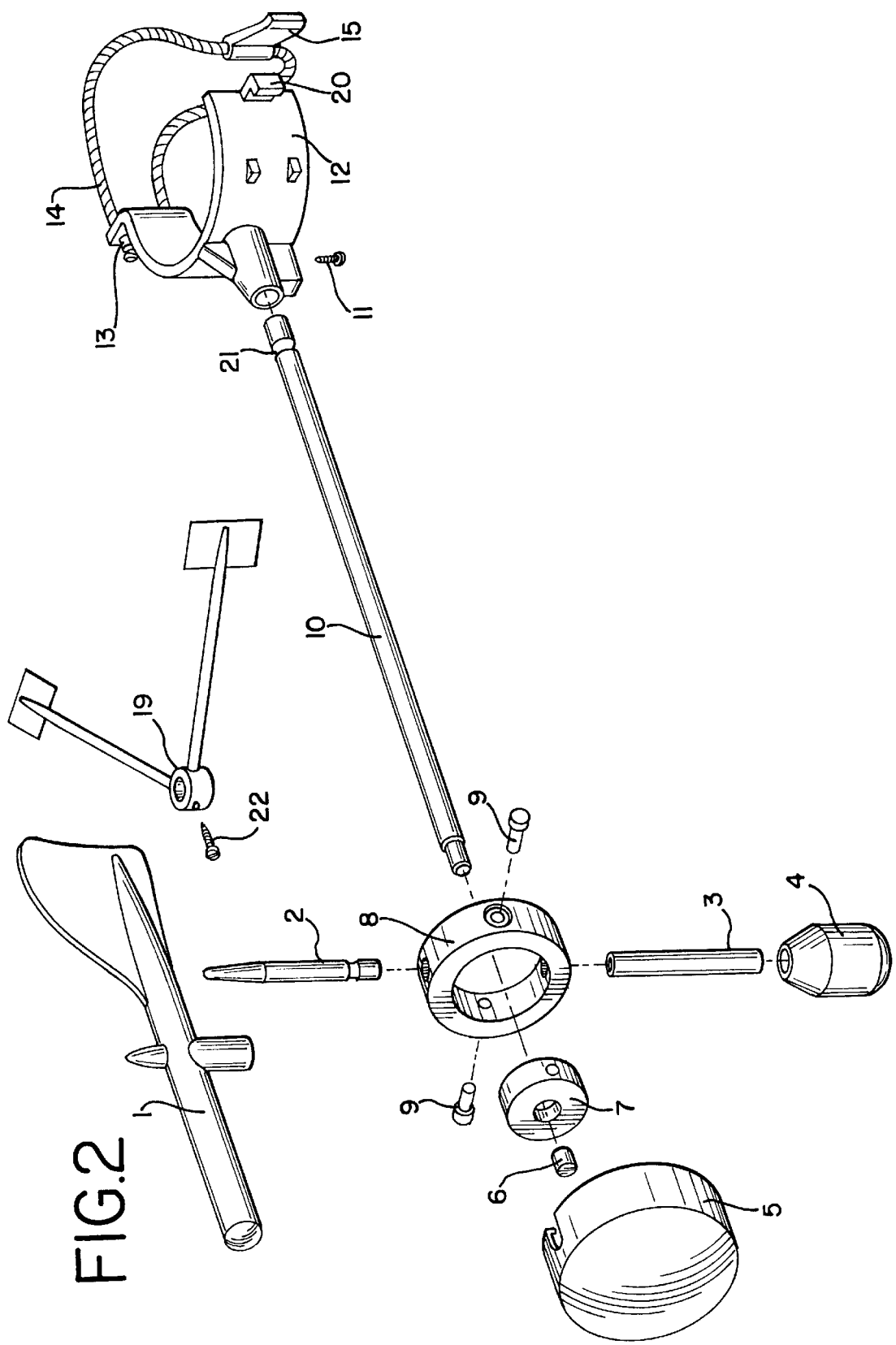

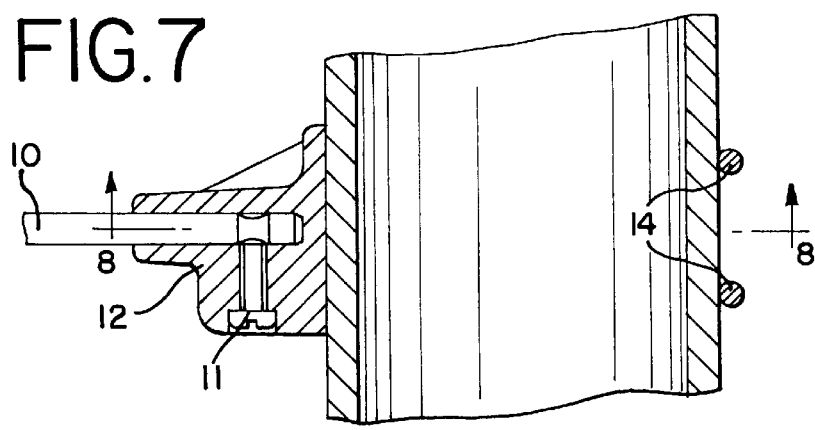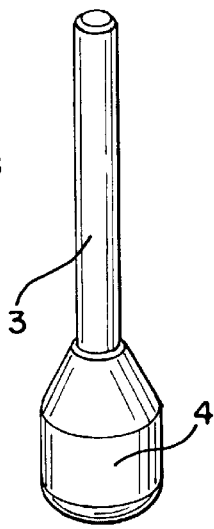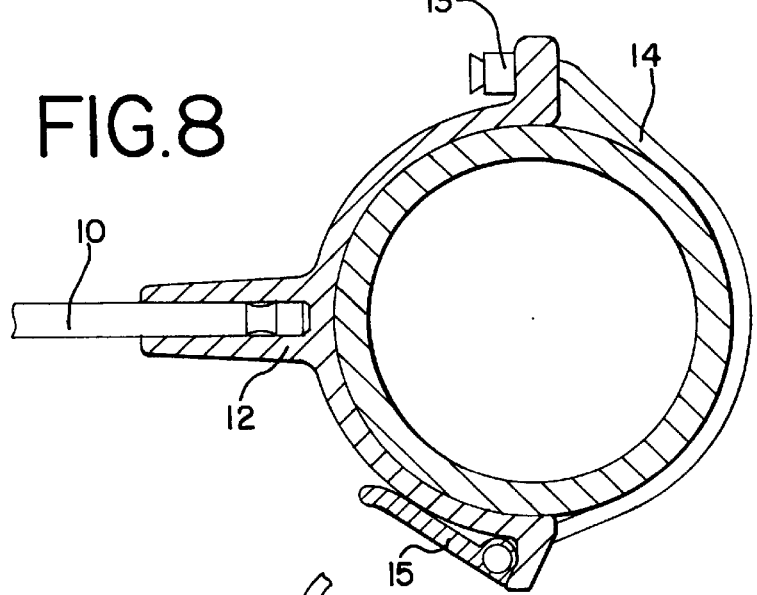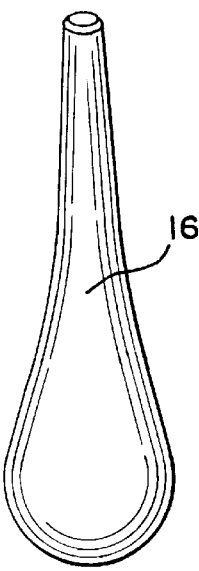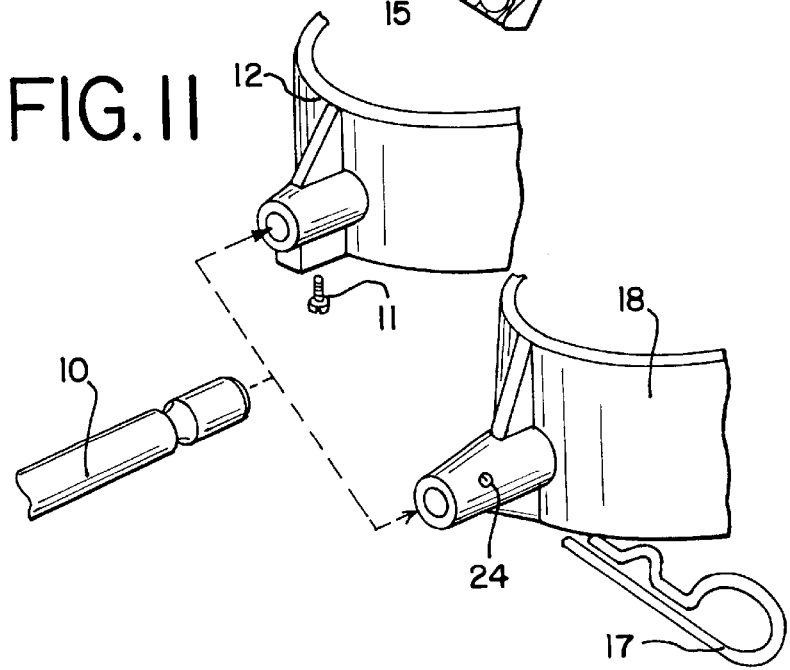

WIND DIRECTION INDICATOR

FIELD OF THE INVENTION

This invention relates to the wind direction indicator.

BACKGROUND TO THE INVENTION

Wind direction indicators for use with air-powered vehicles are known and when used with yachts are referred to as burgees. A wind direction indicator has a basic structure of a wind vane mounted for rotation on a support, the support being connected to the yacht so that the axis of rotation is vertical. The wind direction indicator which may be in the form of a flag, for example, is forced by the wind to adopt the line of least resistance to it, thus pointing to the wind direction.

It is a disadvantage of known burgees that they are rigidly connected to the yacht structure. As a yacht is essentially an unstable platform, pitching and yawing of the yacht will cause the wind vane support to adopt a non-vertical configuration. This increases friction at the bearing surface between the vane and the support and also leads to inaccuracy and difficulty in determining wind direction.

It is an object to the invention to provide an improved wind direction indicator for use on wind-powered vehicles.

SUMMARY OF THE INVENTION

According to the invention, there is provided a wind direction indicator for a wind powered vehicle comprising a rotatable wind vane, a support for connection to a said vehicle and three-dimensional rotation means connected between the vane and the support.

Preferably the rotation means comprises a gimbal mechanism. Use of the gimbal mechanism allows the wind vane to be self-levelling, thus reducing set-up time and providing a more accurate and easily viewable wind direction indicator.

Preferably a stabilizing weight is connected to the gimbal mechanism to maintain the wind vane vertically upright.

Preferably the wind direction indicator is formed from non-corrosive and light material.

Further features of the invention are recited in the appendant claims.

BRIEF DESCRIPTION OF THE DRAWINGS

An embodiment of the invention will now by described, by way of example, with reference to the accompanying drawings in which:

FIG. 1 is a perspective view of a first embodiment of the invention.

FIG. 2 is an exploded perspective view of the embodiment of FIG. 1.

FIG. 3 is a cross-sectional of view in the plane of the axes of the lower post 3 and cantilever bar 10 of FIG. 1.

FIG. 7 is an enlarged view of the connection arrangement of FIG. 3.

FIG. 8 is a view in the direction 7'—7' of FIG. 7.

FIGS. 9 and 10 show alternative designs of counterweight for the embodiment of the FIG. 1.

FIG. 11 shows alternative support mounting arrangements.

DESCRIPTION OF THE EMBODIMENTS OF THE INVENTION

Figure 6:
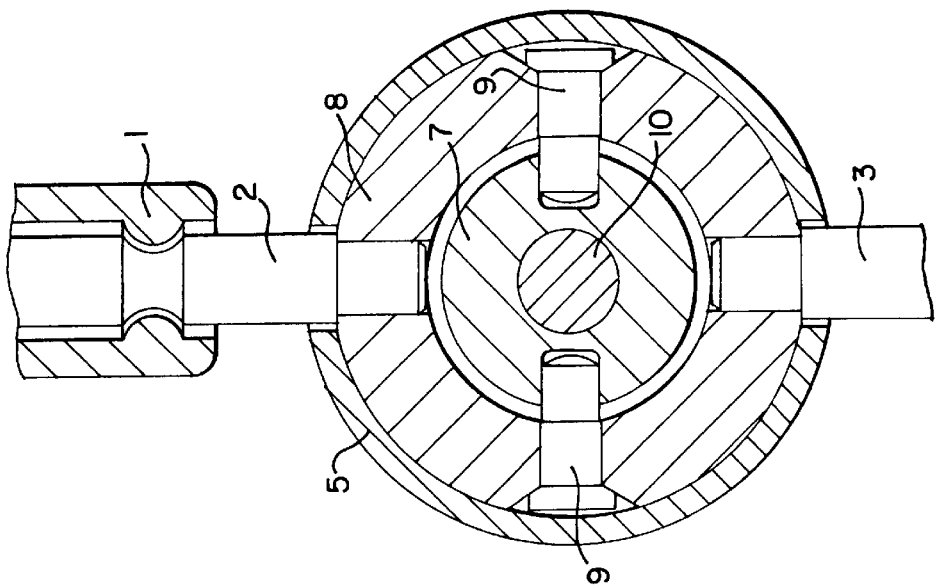
FIG. 6 is a view similar to FIG. 5 showing a variation in construction of the gimbal mechanism.

With reference to FIGS. 1–5, a first embodiment of the wind direction indicator of the invention is shown.

The indicator is provided with a wind pointer or vane 1 mounted for rotation about a shaft 2. The shaft 2 and vane 1 provide a bearing arrangement in which the wind vane 1 is supported on the tip of the shaft 2 as shown in FIG. 3, the shaft 2 at its other end being connected to an outer ring 8 of a gimbal mechanism. The shaft 2 is provided with the neck 24 which engages a circumferential lip 25 of the vane 1 in a click-stop manner. A second shaft 3 is connected at one end to the outer ring 8 as a point diametrically opposite to the shaft 2. A stabilizing weight 4 is connected to the opposed end of shaft 3.

The gimbal outer ring 8 is rotatably mounted relative to a gimbal inner ring 7, which is pivotally connected to ring 8 by means of pivots 9.

A cover 5 is preferably provided partially to cover the gimbal mechanism.

A cantilever bar 10 is received at one end in a central bore in ring 7 so that ring 7 can rotate about bar 10. Ring 7 is held in place by means of retainer cap 6.

Cantilever bar 10 as its other end engages a means for connection to a yacht mast or any other convenient place for mounting, in the form of a flexible collar which comprises a mast bracket 12 formed of flexible material to grasp masts of different diameters and a quick release connector comprising a bungee rope 14 connected to bracket 12 by crimped connections 13 at one end and provided with a latch 15 at the other for engagement with a lip 20. The cantilever bar 10 is secured to bracket 12 by means of screw 11 engaging a necked portion 21 of shaft 10.

An angle marker 19 is further connected to shaft 2, held in place by screw 22, the angle marker marking the limits of reliable wind direction indication of the vane 1.

In use, the bracket 12 is strapped, using bungee rope 14, to a yacht mast. It does not matter if cantilever beam 10 is horizontal or not since weight 4 through the gimbal mechanism ensures that shaft 3 in general points vertically downwards and thus shaft 2 upon which wind vane 1 is mounted points vertically upwards, so that the wind vane is mounted accurately and without increased friction consistently to point the wind direction.

Preferably, the vane 1 is formed of one piece light-weight material, for example, plastics and is highly reflective, fluorescent and/or of an eye-catching colour. The centre of gravity of the vane 1 is preferably in line with the pivot point and axis of rotation of shaft 2 to reduce friction further.

The stabilizing weight 4 is preferably formed from metal and may be formed as a single streamline piece 16 as shown in FIG. 10 or, less expensively, formed separately and attached to shaft 3 as shown in FIGS. 1–3 and 9.

The cantilever beam 10 may be connected to bracket 12 by means of screw 11 or alternatively by means of a cotter pin 17, received in opening 24 in modified collar 18 as shown in FIG. 11.

Figure 5:
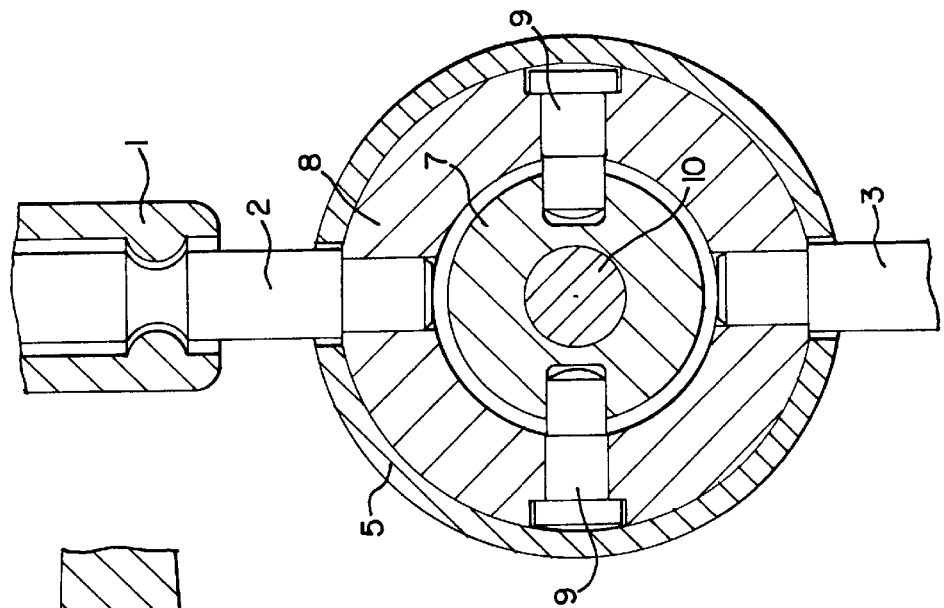
FIG. 5 is a cross-section of view through 5'—5' of FIG. 4.
Figure 4:
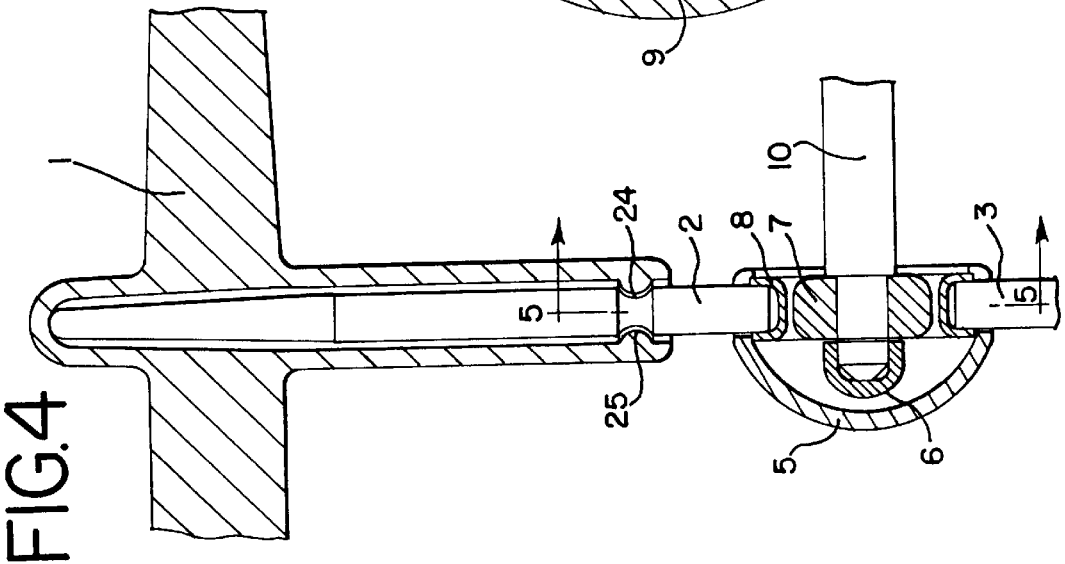
FIG. 4 is an enlarged view of the gimbal mechanism of FIG. 3.

The pivot pins 9 are counter-sunk into outer-ring 8 and the counter-sink recesses may either have straight sides as shown in FIG. 5 or bevelled sides as shown in FIG. 6.

Figure 12:
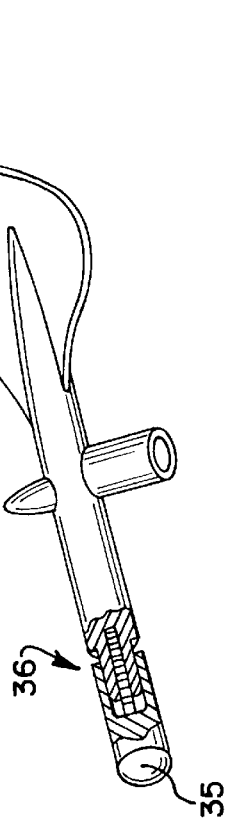
FIGS. 12 and 13 are perspective views of the wind vane showing modifications thereof.
Figure 13:
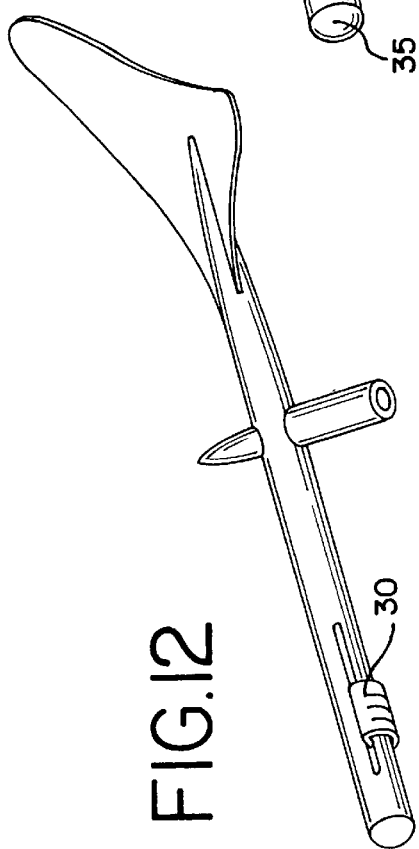

The vane may be provided with an adjustable balance weight to fine tune the position of the centre of gravity, as shown in FIG. 12 in which a slidable balance weight 30 is provided or as shown in FIG. 13 in which the head 35 of the vane is adjustable via a screw thread arrangement 36.

The vane 1 has been shown balanced by counter weight 4 to maintain the vane 1 in an upright position. However, the counter weight 4 may be omitted, so that vane 1 hangs vertically downwards under its weight, with, for example, a PTFE bearing surface being provided at neck 25.

Figure 14:
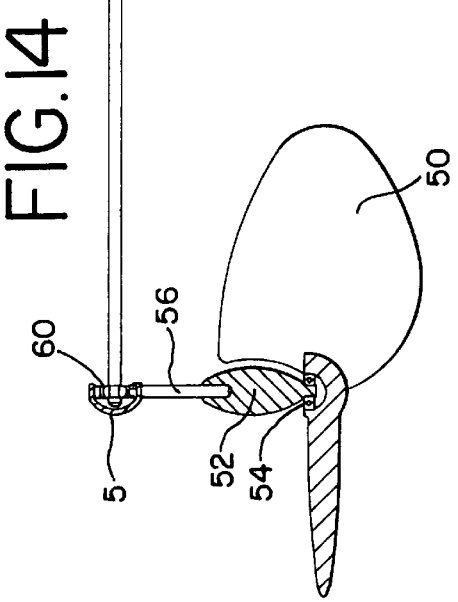
FIG. 14 is a cross-sectional view similar to FIG. 3 of a second embodiment of the invention.

FIG. 14 illustrates a second embodiment of the invention which is similar to the first embodiment save that the vane 50 is connected to the counter weight 52 via a bearing 54, the counter weight 52 being connected to the gimbal mechanism 60 via shaft 56.

Figure 15:
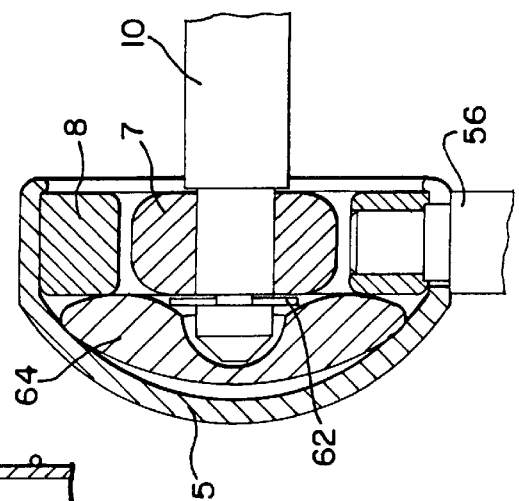
FIG. 15 is an enlarged cross-sectional view showing a variation of the gimbal mechanism of the embodiment of FIG. 2.

A variation of the embodiment of FIG. 14 is shown in FIG. 15 in which an alternative method of fixing shaft 10 to inner gimbal 7 is provided by means of a circlip or E-Ring 62. Furthermore, the space between the cover 5 and the inner and outer gimbals 7, 8 is filled with a substance 64 to provide damping, for example a silicone gel, latex gel, a gauze cloth or wool to increase the friction between the inner and outer gimbals and provide a damping effect when the gimbal rotates in response to movement of the vehicle to which the wind direction indicator is attached. This modification is also suitable for the first embodiment.

Whilst the wind direction indicator has been illustrated for use with a yacht, this is not to be construed as limitative and the indicator is useful for other wind-powered vehicles, for example with other water vehicles such as wind-surfers and land vehicles such as sand yachts or ice yachts.

The precise arrangement of the gimbal mechanism is not to be construed as limitative and other devices allowing three-dimensional rotation, for example, a ball and socket joint, may be used.

We claim:

1. A wind direction indicator for a wind powered vehicle comprising a shaft, a wind vane rotatable about the shaft, wherein the shaft and vane are engageable in a click-stop manner, a support for connection to said vehicle, three-dimensional rotation means disposed between the shaft and the support, wherein the rotation means is connected to the shaft, and means for damping the movement of the three-dimensional rotation means.

2. An indicator has claimed in claim 1 wherein the rotation means comprises a gimbal mechanism.

3. An indicator has claimed in claim 1 wherein the rotation means comprises a ball and socket joint.

4. An indicator has claimed in claim 1 further comprising a stabilizing weight connected to the rotation means.

5. An indicator has claimed in claim 4 wherein the stabilizing weight is connected to the rotation means via a shaft.

6. An indicator has claimed in claim 1 wherein the support includes means for connection to a said vehicle.

7. An indicator has claimed in claim 6 wherein the connection means comprises a bracket having a releasable closure.

8. An indicator has claimed in claim 1 further comprising an angle marker for marking the limits of reliable wind indication of the vane.

9. An indicator has claimed in claim 1 wherein at least one of the components is formed from non-corrosive material.

10. An indicator has claimed in claim 1 wherein the centre of gravity of the vane is in line with the axis of rotation thereof.

11. An indicator as claimed in claim 10 wherein the vane includes means for adjusting the position of said centre of gravity.

12. An indicator as claimed in claim 1 wherein the damping means consist of one of gel, fibre or woven material.

13. An indicator as claimed in claim 4 wherein the stabilising weight is provided between the vane and the three-dimensional rotation means.

14. An indicator as claimed in claim 1 wherein the shaft has a neck engaging a circumferential lip of the vane.

15. A wind direction indicator for a wind powered vehicle comprising a rotatable wind vane, a support for connection to said vehicle, three-dimensional rotation means disposed between the vane and the support, and a shaft connected to the rotation means, wherein the vane is rotatable about the shaft, and wherein the shaft and the vane are engageable in a click-stop manner.

16. An indicator as claimed in claim 15 wherein the shaft has a neck engaging a circumferential lip of the vane.

* * * * *